United States Patent Office 2,785,184
Patented Mar. 12, 1957

2,785,184

1,4b-DIMETHYL-3-OXO-4a - HYDROXY - 7 - ISOPROPYLTETRADECAHYDROPHENANTHRENE - 1 - CARBOXYLIC ACID LACTONE AND PREPARATION THEREOF

Thomas F. Sanderson, Wilmington, Del., assignor to Hercules Powder Company, Wilmington, Del., a corporation of Delaware No Drawing. Application February 9, 1955,
Serial No. 487,205

3 Claims. (Cl. 260—343.3)

The present invention relates to a new composition of matter and to a process for its preparation. More particularly, it relates to the lactone of 4a-hydroxy-1,4b-dimethyl - 3 - oxo - 7-isopropyltetradecahydrophenanthrene-1-carboxylic acid and to the preparation thereof.

It is known in the art that dihydroabietic acid can be converted to a resin acid lactone by treatment with concentrated sulfuric acid. This lactone is commonly called "the lactone of hydroxytetrahydroabietic acid" and is characterized by a melting point of 131–132° C. and $[\alpha]_D -3°$. The structure of this lactone has recently been established by reasonable evidence that the angular methyl group is at the 4b position and the alcoholic oxygen at the 4a position, the angular methyl group having shifted during lactonization from the 4a position which it has in dihydroabietic acid to the 4b position. The lactone is extremely stable and does not readily undergo such reactions as hydrolysis, etc., which break the lactone ring.

It is further known that the lactone so produced can be converted into a mixture of two different dihydroresin acids by reaction with a Grignard reagent. This latter process is disclosed in U. S. Patent No. 2,360,204, and it is established that the two dihydroresin acids described in that patent or of the following formulae:

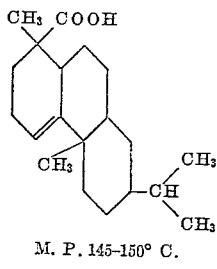

M. P. 145–150° C.
I

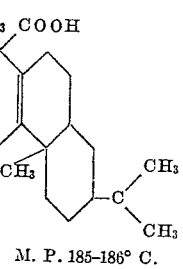

M. P. 185–186° C.
II

In accordance with the present invention, it has been found that esters of the acid of Formula I can be oxidized using molecular oxygen or chromium trioxide, for instance, to form an α,β-unsaturated ketone of the following probable formula:

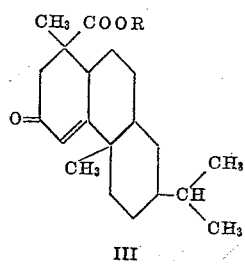

III wherein R is an alkyl group, for instance, and that this ketone in turn can be converted by an alkaline hydrolysis and acidification to a novel and useful compound, the lactone of 4a-hydroxy-1,4b-dimethyl-3-oxo-7-isopropyltetradecahydrophenanthrene-1-carboxylic acid having the following formula:

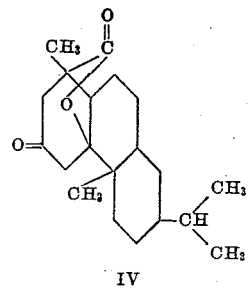

IV

The following examples will illustrate the preparation of the compound of the invention. All parts and percentages are by weight unless otherwise specified.

Example 1

Into a reaction vessel equipped with reflux condenser and stirrer there was placed 30.4 parts of dihydroresin acid of Formula I dissolved in 390 parts acetone. The solution was stirred and brought to reflux. There was then added 13.8 parts of anhydrous potassium carbonate followed by 14.2 parts of methyl iodide. The resulting mixture was stirred and refluxed overnight. The following day the solids were removed by filtration, the filtrate concentrated to about ⅕ volume and then diluted with 500 parts of water. The resulting mixture was extracted with ether, the ether solution washed with water, dried over sodium sulfate and evaporated to dryness. There was obtained about 30 parts of the methyl ester of the starting acid.

Into a reaction vessel equipped with a stirrer and a gas inlet there were placed 5 parts of the methyl ester of the dihydroresin acid prepared as above and 0.2 part of a hydrocarbon solution of cobalt naphthenate analyzing 6% cobalt. The contents of the vessel were then heated to about 90° C. and the system was flushed and filled with oxygen. The stirrer was then started and the absorption of oxygen began in 3 minutes, and at the end of 3 hours 96 mole percent of oxygen, based on the weight of the methyl ester of the dihydroresin acid, had been absorbed. The reaction was then stopped and the contents of the vessel was dissolved in ether, dried over sodium sulfate, and evaporated to dryness. There was obtained 5.2 parts of a crystalline material which on ultraviolet analysis showed maximum absorption in the region of 242μ, indicative of a high content of an α,β-unsaturated ketone.

Five parts of the crude oxidate obtained as above was next treated with Girard's reagent (trimethylaminoacethydrazide hydrochloride) in the following manner to separate relatively pure keto oxidation product from other products of the oxidation: The crude oxidate was dissolved in approximately 24 parts of ethyl alcohol containing 5 parts of Girard's reagent and approximately 5 parts of acetic acid. The resulting solution was heated under reflux for one hour, cooled and diluted with approximately 100 parts of ice water containing 3 parts of sodium hydroxide. This mixture was extracted three times with ether to remove materials unreacted with Girard's reagent. To the resultant clear aqueous layer there was added 27 parts of concentrated hydrochloric acid and after standing one hour the resultant cloudy mixture was extracted with ether. The ether extract was washed, dried and evaporated to dryness to yield 1.75 parts of the α,β-unsaturated ketone of Formula III. (Analysis and verification of the formula to be presented in Example 2.)

The 1.75 parts of ketone obtained as above was dissolved in approximately 23 parts of diethylene glycol containing 1 part of potassium hydroxide and the solution was heated for 1 hour. The solution was next cooled, diluted with water and extracted with ether. The aqueous layer was acidified and the resulting precipitate dissolved in ether. Evaporation of the ether extract yielded 1.65 parts of a crystalline material which upon recrystallization from methanol melted at 167–168° C. Ultraviolet absorption analysis of the material showed no conjugated absorption, hence, the material had lactonized upon acidification.

*Analysis:*—found—C, 74.81 and 75.20; H, 9.57 and 9.61—calculated for $C_{20}H_{30}O_3$—C, 75.43; H, 9.50. Analysis thus indicated that the compound is the lactone of Formula IV.

*Example 2*

Sixty parts of the same methyl ester of the dihydroresin acid employed in Example 1, admixed with 0.8 part of a solution of cobalt naphthenate in petroleum naphtha analyzing 6% cobalt, was reacted with oxygen at 90° C. following the procedure of Example 1 until a total of 7.36 parts of oxygen had been absorbed.

The total oxidate was then subjected to a Girard separation following the procedure of Example 1 to obtain 20.7 parts of an $\alpha,\beta$-unsaturated ketone of Formula III $\lambda_{max.}^{alc.}$: 246 m$\mu$ ($\alpha$, 12)

The $\alpha,\beta$-unsaturated ketone was further purified by chromatographic adsorption on a column of alumina employing as a solvent 20 parts of an equivolume mixture of hexane and benzene to obtain 14.9 parts of crystalline compound after evaporation of the effluent from the column. The crystalline compound was then recrystallized from methanol to give a yield of 13.4 parts of pure compound (M. P. 59.5–60.5° C.; $[\alpha]_D^{25}$ +235° (CHCl$_3$);

$\lambda_{max.}^{alc.}$: 242 m$\mu$ ($\epsilon$, 15,000); $\lambda_{max.}^{C=O}$ 5.75$\mu$, 5.94$\mu$ (Nujol)

*Analysis.*—Calculated for $C_{21}H_{32}O_3$; C, 75.86; H, 9.70. Found: C, 75.82; H, 9.67.

A 2,4-dinitrophenylhydrazone derivative of the compound was prepared (M. P. 181–182° C.; analysis: calculated—N, 10.93; found—N, 10.6). Analysis thus indicates the compound to be the $\alpha,\beta$-unsaturated ketone of Formula III.

A mixture comprising 2.69 parts of the above $\alpha,\beta$-unsaturated ketone, 2.69 parts of potassium hydroxide, 23 parts of diethylene glycol and 1 part of water was refluxed for 1.5 hours and then poured into 100 parts of water and neutralized with dilute hydrochloric acid. The product was extracted with ether and, after washing and drying, evaporation of the extract yielded 2.41 parts of an oil which crystallized upon standing. Recrystallization from methanol gave 1.87 parts (73% yield) of crystals, M. P. 168–169° C. Further recrystallization from methanol raised the melting point to 172–173° C.;

$[\alpha]_D^{25}$ —16° (CHCl$_3$); $\lambda_{max.}^{C=O}$ 5.65$\mu$, 5.78$\mu$ (CS$_2$)

*Analysis.*—Calculated for $C_{20}H_{30}O_3$—C, 75.43; H, 9.50. Found: C, 75.20; H, 9.61. A lactone of Formula IV is thus indicated.

*Example 3*

Into a reaction vessel of the same type used in Example 1, there was placed 6.36 parts of the methyl ester of the dihydroresin acid of Formula I, 53 parts of acetic acid and 66 parts of acetic anhydride. The resultant solution was cooled to 20° C. and there was then added 2.67 parts of solid chromium trioxide over a period of 7 hours. After stirring overnight at room temperature, the dark green solution was diluted with water and extracted with ether. The resultant ether solution was washed with water and evaporated to obtain 6.4 parts of solid oxidate. This oxidate gave a positive 2,4-dinitrophenylhydrazone test for ketone and absorbed ultraviolet light at 244 m$\mu$, $\alpha$ 20, indicative of an $\alpha,\beta$-unsaturated carbonyl system. The oxidate was next subjected to Girard separation and converted to the lactone of Formula IV following procedure of Example 1.

In the preceding examples, the methyl ester of the dihydroresin acid of Formula I had been used as the starting material for purposes of illustration. It is clear, however, that any other alkyl, hydroxyalkyl, cycloalkyl, aryl or aralkyl ester can be treated in like manner to produce the lactone of the invention. Exemplary of such esters are the ethyl, propyl, butyl, hydroxyethyl, glyceryl, cyclohexyl and benzyl esters.

As shown in the examples, the oxidation of the starting ester can be effected by either elemental oxygen or by a strong oxidizing compound such as chromium trioxide. When elemental oxygen is utilized, it is desirable to employ a metallic naphthenate as a catalyst to facilitate the reaction. Examples of suitable metallic naphthenates, in addition to cobalt naphthenate, are those of lead, manganese, barium, aluminum, copper, tin and zinc. Also, when elemental oxygen is used, it is preferred to carry out the oxidation in the absence of a vehicle or solvent for the reactants. Solvents, however, can be used, but their use results in a decreased rate of oxidation.

On the other hand, when chromium trioxide is employed in the initial oxidation step, it is preferred to employ an inert anhydrous solvent such as acetic acid and to perform the reaction in the presence of sufficient acetic anhydride to combine with the water liberated during the reaction and thus maintain an anhydrous system.

The crude oxidate resulting from the initial oxidation is believed to contain not only the intermediate $\alpha,\beta$-unsaturated ketone but also minor amounts of a 3-hydroxy compound and other alcohols. As is illustrated in the examples, it is preferred to separate the $\alpha,\beta$-unsaturated ketone from the other products of the oxidation and this can be performed, as shown in the examples, either by reaction with Girard's reagent or by chromatographic separation or both. Separation with Girard's reagent is a well-known technique for separating active carbonyl containing components from other compounds including those containing inactive carbonyl, i. e., ester, amide, etc., groups.

Following separation of the $\alpha,\beta$-unsaturated ketone, it can be converted by alkaline hydrolysis and acidification to the lactone of the invention by the procedures previously illustrated. The free acid from which the lactone is derived is an unstable compound and forms the lactone readily in the presence of strong acid.

The lactone of the invention is a valuable compound with a variety of uses. For instance, it is a valuable intermediate useful in the synthesis of steroids similar in structure to those found in the adrenal cortex.

In addition, the lactone has been found to be compatible with nitrocellulose and is a valuable plasticizing ingredient in nitrocellulose lacquers. Further, the lactone when admixed with an equal part of neoprene in toluene solution forms a delayed tack adhesive having the general properties of the adhesives described in U. S. Patent No. 2,462,029.

What I claim and desire to protect by Letters Patent is:

1. The lactone of 4a-hydroxy-1,4b-dimethyl-3-oxo-7-isopropyltetradecahydrophenanthrene-1-carboxylic acid.

2. The process of preparing the compound of claim 1 which comprises oxidizing an ester of an acid having the formula

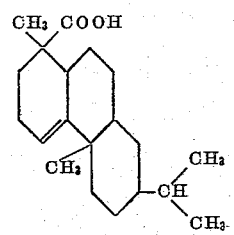

by contacting said ester with molecular oxygen in the presence of a metallic naphthenate, isolating an α,β-unsaturated ketone from other products of oxidation, subjecting said ketone to alkaline hydrolysis, and acidifying.

3. A process for the preparation of the compound of claim 1 which comprises oxidizing an ester of an acid having the formula

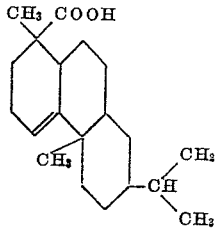

by contacting said ester with anhydrous chromium trioxide, isolating an α,β-unsaturated ketone from other products of oxidation, subjecting said ketone to alkaline hydrolysis, and acidifying.

References Cited in the file of this patent
UNITED STATES PATENTS

| | | |
|---|---|---|
| 2,434,643 | Drake | Jan. 20, 1948 |
| 2,656,343 | Ritchie | Oct. 20, 1953 |
| 2,703,796 | Ritchie | Mar. 8, 1955 |
| 2,750,371 | Subluskey | June 12, 1956 |
| 2,750,372 | Minn | June 12, 1956 |

OTHER REFERENCES

Journal Am. Chem. Soc. vol. 61, pages 3197–3199 (1939).